April 1, 1947.  S. B. HEATH ET AL  2,418,408
METHOD OF MAKING FUSED SALT MIXTURES
Filed June 26, 1944   2 Sheets-Sheet 1

INVENTORS.
Sheldon B. Heath &
BY  Carl A. Kuehl

Griswold & Burdick
ATTORNEYS

April 1, 1947.  S. B. HEATH ET AL  2,418,408
METHOD OF MAKING FUSED SALT MIXTURES
Filed June 26, 1944  2 Sheets-Sheet 2

INVENTORS.
Sheldon B. Heath &
BY Carl A. Kuehl

Griswold & Burdick
ATTORNEYS

UNITED STATES PATENT OFFICE

2,418,408

METHOD OF MAKING FUSED SALT MIXTURES

Sheldon B. Heath and Carl A. Kuehl, Midland, Mich., assignors to The Dow Chemical Company, Midland, Mich., a corporation of Michigan Application June 26, 1944, Serial No. 542,228

4 Claims. (Cl. 75—93)

This invention relates to improvements in methods for preparing fused anhydrous salt mixtures suitable as protective fluxes for melting and refining magnesium and magnesium alloys, as well as in the preparation of magnesium alloys. The improved method is also adapted for preparing salt mixtures used in the electrolytic production of magnesium.

Such salt mixtures are fusible at temperatures below the melting point magnesium. In general they are composed principally of chlorides of the alkali and alkaline earth metals and magnesium, but contain also a minor proportion of a similar fluoride. The usual chloride components are the chlorides of magnesium, sodium, potassium, calcium or barium, while the fluoride component is calcium fluoride or sodium fluoride. Various specific mixtures are used commercially, which differ in freezing point, specific gravity and other properties, depending upon the particular uses for which they are intended. For special purposes other salts than those mentioned may be included in the mixture. In one example, manganese chloride is employed in substantial proportion to form a flux for use according to the methods for alloying manganese with magnesium described in U. S. Patents 2,261,905 and 2,261,906. The mixtures containing magnesium chloride are most extensively used, and in these magnesium oxide is found as an impurity, although the latter is sometimes intentionally added as a thickening agent. Representative flux compositions are given in the following table, which shows the specified maximum and minimum percentages by weight of the several components:

| Flux, Salt | A | | B | | C | | D | |
|---|---|---|---|---|---|---|---|---|
| | Min. | Max. | Min. | Max. | Min. | Max. | Min. | Max. |
| MgCl$_2$ | | | 31.0 | 37.0 | | | 23.0 | 29.0 |
| KCl | 51.0 | | | 49.0 | 20.0 | 26.0 | 55.0 | |
| NaCl | | | | | | | 8.0 | 14.0 |
| CaCl$_2$ | 24.0 | 30.0 | | | | | | |
| BaCl$_2$ | 11.0 | 15.0 | 8.0 | 11.0 | | | | |
| MnCl$_2$ | | | | | 68.0 | 76.0 | | |
| CaF$_2$ | 1.5 | 3.5 | 1.5 | 3.5 | 1.5 | 3.5 | 1.5 | 3.5 |
| MgO | | | | 4.0 | | | | 4.0 |

The mixtures have heretofore been made usually by melting down the components in desired proportions to produce a homogeneous melt which, except in cases where the melt is used immediately for the intended purpose, is then poured into metal containers or molds and allowed to solidify by cooling. The solid blocks or cakes are then crushed and ground to suitable size for use and the subdivided material is put in closed containers for shipment and storage.

The preparation of the fused salt mixtures is sometimes combined with the final dehydration of the magnesium chloride component. The difficulties of dehydrating magnesium chloride, which normally crystallizes as the hexahydrate, MgCl$_2$.6H$_2$O, are well known. Special procedures are necessary in order to avoid excessive decomposition of the salt when it is dried. Dehydration to a crystal water content corresponding to about 4H$_2$O is not difficult, and by using special precautions the dehydration can be carried by air-drying to a water content corresponding to as low as from 1H$_2$O to 2H$_2$O. The final dehydration of the hydrated salt, however, is often accomplished by or in connection with the fusion of the salt mixtures containing it. It is, therefore, sometimes desirable to use a partially dehydrated magnesium chloride for making up the flux mixtures, the final dehydration of which is effected coincidentally with the melting of the mix.

In the past the melting of the salt mixtures has been carried out in a melting pot, which is essentially a batch operation. Such procedure is satisfactory as respects the quality of the fused product, but it is time-consuming and wasteful of heat. The solidification of the fused salt is slow and the comminution of the solid cakes is a laborious and wasteful operation.

It is an object of this invention to provide a process adapted for large scale and continuous operation, which avoids or overcomes the disadvantages of the prior art methods. A particular object is to provide a continuous mode of operation adapted to large-scale production which delivers a subdivided product directly. The invention is fully described in the following specification and annexed drawing, illustrating a preferred embodiment of the invention.

Figure 1:
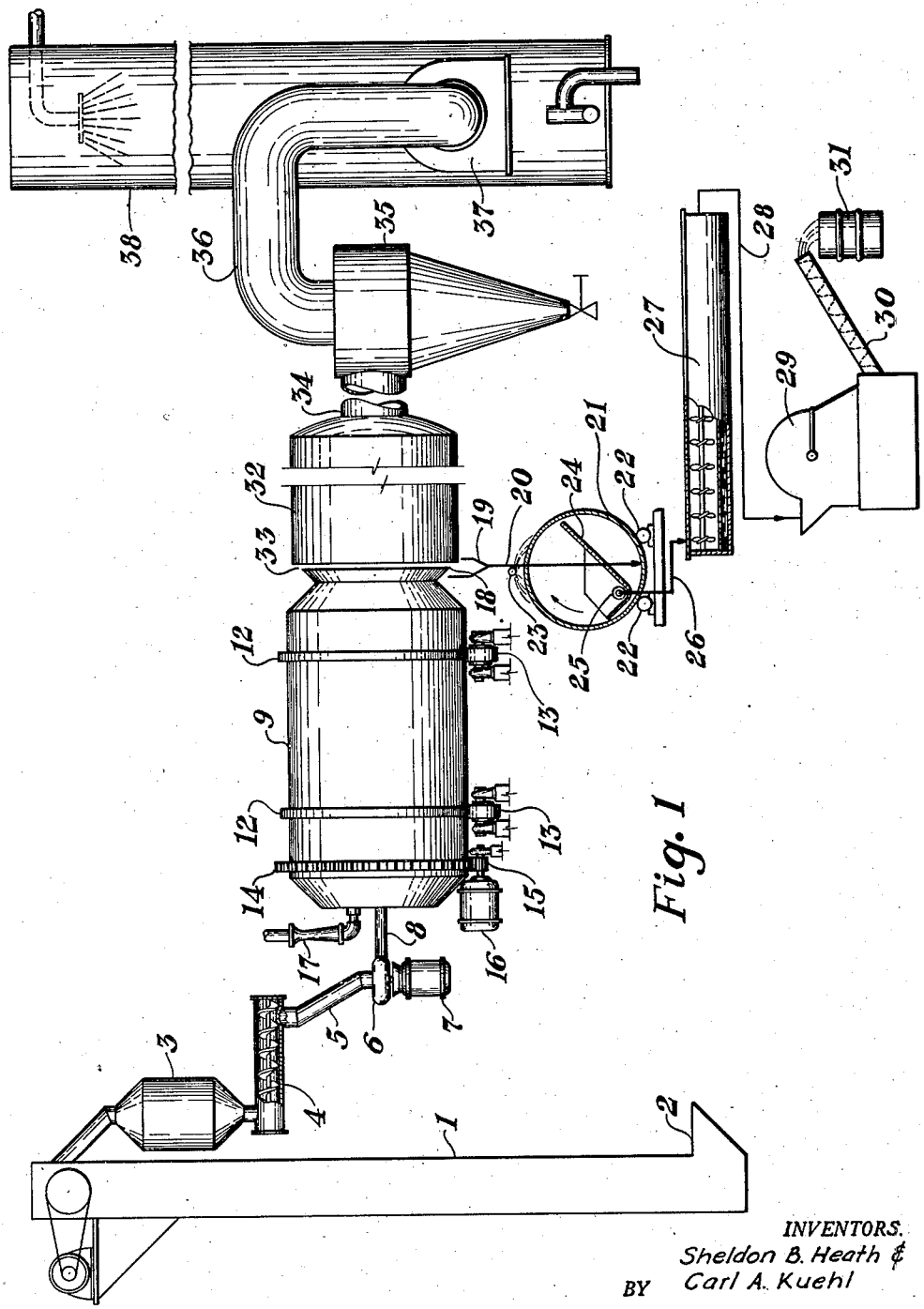
Fig. 1 is a graphic flow-sheet showing the layout of apparatus and flow of materials according to the invention.

In the final dehydration of magnesium chloride, wherein the partially dehydrated salt is fed into a fused anhydrous salt bath, it has been heretofore considered essential to protect the surface of the molten mixture from access of air, in order to minimize the decomposition of the chloride. We have found, however, that the problem can be solved in a highly satisfactory and practical manner by blanketing the surface of the melt with hot combustion gases which are employed as the source of heat for dehydrating and melting the salt, if certain precautions are observed, as hereinafter described.

The various salt mixtures, with which the invention is concerned, in most cases do not have a definite melting point. They solidify from the molten state over a range of temperature. In general, they have an initial freezing point in the range from about 750° to 1150° F., depending upon the proportions of the component salts. The freezing range may extend for as much as 100° F. below the initial freezing point. At temperatures of 50° to 100° F. above the initial freezing point they are usually freely fluid. By maintaining a pool of the molten salt mixture and heating the same by hot combustion gases directed immediately above the surface of the pool, it is possible to feed the unfused component salts, including partially dehydrated magnesium chloride, in comminuted form on to the surface of the pool, simultaneously fusing down the added salts and dehydrating the magnesium chloride without material decomposition of the latter. The molten pool should be maintained in a thin and freely fluid condition but overheating should be avoided, since the higher the temperature of the pool the greater is the decomposition of the magnesium chloride. It is preferred to maintain the molten pool at a temperature not more than about 200° F. above the initial freezing point thereof.

For incorporating the added salts into the molten mixture rapidly a certain amount of agitation is desirable. A mechanical agitator is not practical for the purpose, due to mechanical difficulties imposed by the high operating temperature, as well as by the necessity in such case of employing a metallic structure. e. g. steel, for sufficient strength, which is subject to corrosion by the molten salt and contaminates the product with heavy metal impurities. The requirements of the problem are best supplied by employing an internally fired revolving hearth furnace which can be operated with continuous feed and continuous discharge of product.

A preferred arrangement of apparatus for accomplishing our purpose may be described by reference to the drawing. The raw materials are fed to the process in proportions corresponding to the composition of the desired product. The several salts are fed, in the selected proportions, into the boot 2 of an elevator 1 which lifts them into a supply bin 3. The roughly mixed comminuted salts in bin 3 are forwarded by screw 4 to a conduit 5 which delivers them into a mechanical feeder 6, shown directly connected to drive motor 7. Feeder 6 charges the mixed salts through pipe 8 into a horizontal rotary kiln 9, which may be slightly inclined away from the feed end. Kiln 9 consists of a steel shell 10 (Fig. 2) having a lining 11 of refractory material. It is supported by peripheral tracks 12 resting on rollers 13, and is driven by external gear 14 and pinion 15 from direct-connected motor 16. The feed end of the kiln is closed except for openings to receive feed pipe 8 and one or more fuel burners 17. The kiln is heated by the combustion gases from burner 17 to a temperature sufficient to melt the salt which accumulates in a pool in the bottom until it overflows at the discharge end over lip 18.

The overflowing molten salt drops into a trough 19, which conveys the molten stream, as indicated by line 20, to a flaker 21. The flaker is a horizontal revolving drum supported on rollers 22 and driven at slow speed in the direction shown by the arrow. The drum is externally cooled by a water spray from pipe 23. Within the drum an angular apron 24 is fixedly mounted independently of the drum on end supports (not shown). Apron 24 is constructed with two sides of unequal length, as shown, the outer edges of which approach closely to the wall of the revolving drum, leaving a clearance on the order of about an inch. The molten salt flows from trough 19 on to the interior surface of the revolving drum where it solidifies as a thin layer or film which is continuously carried upward by the moving surface. Due to the shrinkage of the layer of salt on cooling, the film separates from the drum surface and after it passes the median line breaks loose in pieces which fall down into apron 24. The angle-joint of the apron is rounded to accommodate a screw conveyor 25 which feeds the broken plates or flakes of salt to a discharge chute indicated by line 26, through which the material feeds by gravity into a water-jacketed cooler 27. The material is forwarded through the cooler by propellors, and the cooled material is discharged through another chute, indicated by line 28, to a mill 29 where it is broken down into particles of desired fineness. From the mill a loader 30 conveys the comminuted material to a filling station, where it is loaded into containers 31.

The hot combustion gases passing out through the central opening in the discharge end of kiln 9 are directed into an elongated cylindrical cooler 32. The cooler is larger in diameter than the central opening of the kiln, leaving an annular space 33 at the inlet end of the cooler through which air is drawn to dilute and cool the hot gases from a temperature of about 1000° to 1200° F. to a lower temperature suitable for passing through a suction fan. In the cooler some dust is deposited. The cooled gases are passed thence through duct 34 to a centrifugal dust separator 35 where the major portion of dust is deposited and removed. From the separator duct 36 leads the gases to a blower 37 which discharges into a water scrubber 38, where residual dust and acid impurities are removed before the gases are vented from the top of the tower.

Figure 2:
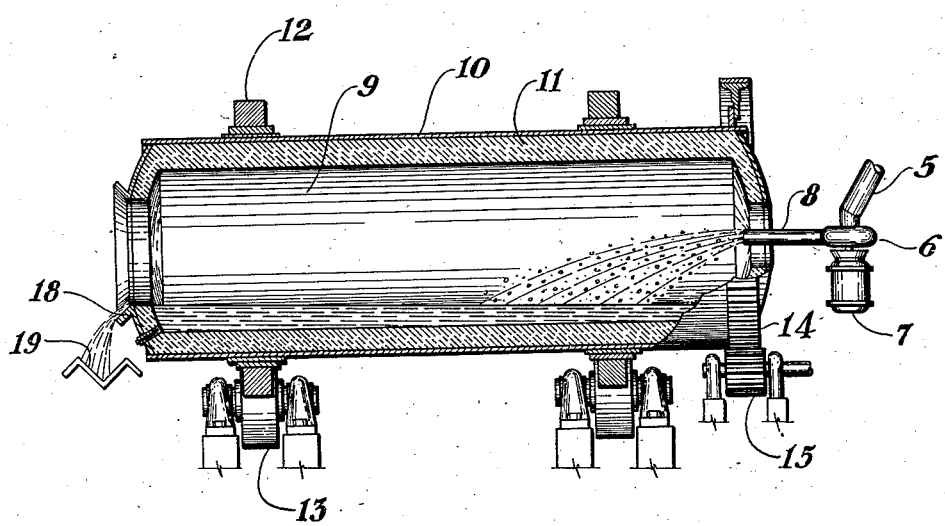
Fig. 2 is a vertical cross-sectional view of the fusion apparatus.
Figure 3:
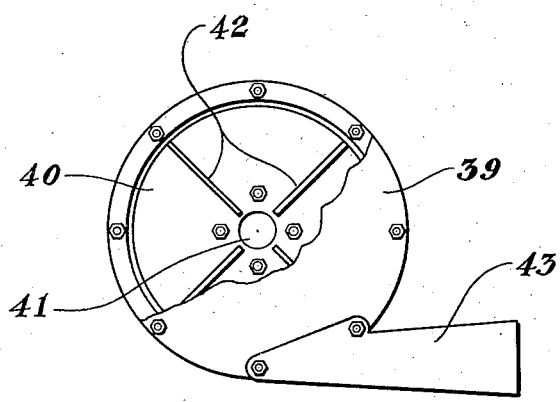
Fig. 3 is a plan view, partly broken away, of a mechanical feeder for the apparatus of Fig. 2.

The mechanical feeder 6, shown in enlarged scale in Fig. 3, is adapted to propel a scattered stream of the solid particles of feed material on to the surface of the pool of molten salt in kiln 9, as illustrated in Fig. 2. The feeder consists of a circular casing 39 enclosing a closely fitting rotor 40 secured to a shaft 41. The rotor is a plate having a plurality of radial vanes 42 secured to its surface. The feed is vertically downward upon the rotor at the center, and the discharge outlet 43 is tangentially located in the casing at the perimeter of the rotor. This type of feeding device mechanically throws the salt particles into the kiln without employing a voluminous current of air.

The operation of the kiln, as described, permits of an economical transfer of heat from the hot combustion gases to the charge to be melted. Upon commencing operation the mixed salt charged into the kiln melts down into a pool of molten salt which is gently agitated by the rotation of the kiln at a speed on the order of 2 to 10 R. P. M. The heat of the combustion gases is transferred both to the surface of the salt pool and to the exposed wall of the kiln above the pool. Heat is absorbed by the wall, as well as being reflected on to the surface of the pool, and a portion of the absorbed heat is transferred to the molten salt by contact during each revolution of the kiln. The feed particles are scattered over the surface of the pool and quickly absorbed and dissolved in it with a very small amount of decomposition of hydrated magnesium chloride, if any, in the feed. This mode of operation provides a high melting capacity and yields a product of acceptable purity. By combining the continuous melting with the continuous flaking and grinding of the solidified salt mixture a type of product answering trade requirements is made with a large saving of fuel, labor and other manufacturing costs.

The operation of the aforesaid process is illustrated by the following example, which is based upon production of a commercial flux corresponding to Type B in the table above. Over a period of thirty days the quantities of materials were used as shown in the second column of the table below. In the third column is shown the composition of the product on the anhydrous basis, calculated from the materials charged, and in the fourth column is the average analysis of the product actually obtained over the period.

| Material | Amount, Lbs. | Calc. percent | Actual percent |
|---|---|---|---|
| KCl | 1,321,600 | 48.0 | 53.0 |
| CaF$_2$ | 64,015 | 2.0 | 2.0 |
| BaCl$_2$.2H$_2$O | 330,400 | 10.0 | 10.0 |
| MgCl$_2$.4H$_2$O | 1,982,400 | 40.0 | 32.0 |
| MgO | | | 3.0 |

The materials used were of commercial purity. The magnesium chloride had the nominal composition of the tetrahydrate. In the weights shown and in the calculated analysis of the product no allowance is made for variance from the exact chemical formulas. The content of magnesium oxide shown by actual analysis of the product derives from a small amount of decomposition of the hydrated magnesium chloride upon dehydration in the process.

The flux produced has an initial freezing point of approximately 780° F. The temperature of the pool of molten salt was maintained at approximately 960° F. during the period. The flaked material was ground to a fineness of 60 to 80 mesh. The total input of materials and output of product was as follows:

|  | Pounds |
|---|---|
| Total materials fed | 3,698,415 |
| Same, anhydrous basis | 2,762,061 |
| Total weight of product | 2,572,650 |

The weight of product obtained, disregarding dust recovered, amounted to 93.1 per cent of anhydrous salts fed to the process. Fuel consumption was only 2.1 cubic feet of natural gas per pound of product.

In cases where the molten salt mixture is to be used immediately without being permitted to solidify, it can be drawn off directly from the kiln through a trough or pipe to convey it to the point of use.

We claim:

1. The method of making fused salt mixtures composed principally of metallic chlorides and adapted for use as protective fluxes for melting magnesium and the like, such mixtures being fusible at temperatures below the melting point of magnesium, which comprises distributing solid particles of the component salts in desired proportion directly upon the surface of a pool of the molten salts contained in an internally fired inclined rotary kiln, while supplying sufficient heat to the same to maintain its temperature not more than about 200° F. above the initial freezing point of the mixture by hot combustion gases directed into the space immediately above the surface of the pool, permitting a stream of the molten salt to overflow from the pool at a point remote from the feed inlet, solidifying the salt so withdrawn as a thin layer upon a moving chilled surface, removing such layer in the form of flakes and comminuting the flakes.

2. The method of making fused salt mixtures composed principally of metallic chlorides and adapted for use as protective fluxes for melting magnesium and the like, such mixtures being fusible at temperatures below the melting point of magnesium, which comprises mechanically mixing the component salts in desired proportion, distributing the mixed salt particles directly upon the surface of a pool of the molten salt mixture contained in an internally fired inclined rotary kiln, while supplying heat sufficient to melt the same by hot combustion gases directed into the space immediately above the surface of the pool, permitting a stream of the molten salt to overflow from the pool at a point remote from the feed inlet, cooling the molten salt to solidify the same as a thin layer, removing the layer in the form of plates or flakes, and grinding the latter.

3. The process according to claim 2 in which flux mixtures containing magnesium chloride are prepared by feeding a partially dehydrated magnesium chloride in the charge and simultaneously dehydrating the same by fusion of the charged salt mixture.

4. The method of making fused salt mixtures composed principally of metallic chlorides and containing magnesium chloride, such mixtures being fusible at temperatures below the melting point of magnesium, which comprises distributing solid particles of partially dehydrated magnesium chloride and of the other component salts in desired proportion directly upon the surface of a pool of the molten salt mixture contained in an internally fired inclined rotary kiln, while heating the same to the fusion temperature by hot combustion gases directed into the space immediately above the surface of the pool, and continuously overflowing a stream of the molten salt from the pool at a point remote from the feed inlet.

SHELDON B. HEATH.
CARL A. KUEHL.

REFERENCES CITED

The following references are of record in the file of this patent:

UNITED STATES PATENTS

| Number | Name | Date |
|---|---|---|
| 2,019,112 | Beekhuis | Oct. 29, 1935 |

OTHER REFERENCES

Chemical Engineering Handbook, Perry, 2nd ed., pages 1999–2003. 1941, pub. by McGraw-Hill Book. (Copy in Div. 3 as book 1-8.)